US006300282B1

United States Patent
Cooley

(10) Patent No.: US 6,300,282 B1
(45) Date of Patent: Oct. 9, 2001

(54) TECHNIQUE FOR REDUCING NITROGEN LEACHING IN SOILS AND IMPROVING POTATO CROP YIELD BY APPLICATION OF SURFACTANTS TO CROP ROOT ZONE

(75) Inventor: Eric Thomas Cooley, DeForest, WI (US)

(73) Assignee: Platte Chemical Company, a Nebraska corporation, Greeley, CO (US)

( * ) Notice: Subject to any disclaimer, the term of this patent is extended or adjusted under 35 U.S.C. 154(b) by 0 days.

(21) Appl. No.: 09/365,283

(22) Filed: Jul. 30, 1999

(51) Int. Cl.$^7$ .................................................. A01N 25/30
(52) U.S. Cl. ......................... 504/351; 504/353; 504/354; 47/DIG. 10
(58) Field of Search ................................... 504/351, 353, 504/354; 47/DIG. 10

(56) References Cited

U.S. PATENT DOCUMENTS

| | | | | |
|---|---|---|---|---|
| 3,458,953 | * | 8/1969 | Moses et al. | 47/58 |
| 4,171,968 | * | 10/1979 | Farone | 71/77 |
| 5,391,542 | * | 2/1995 | Browning | 504/351 |
| 5,922,649 | * | 7/1999 | Pehu et al. | 504/320 |

OTHER PUBLICATIONS

DeBano, Leonard, "The Effect of Hydrophobic Substances on Water Movement in Soil During Infiltration," Soil Sci. Soc. Amer. Proc., vol. 35, pp. 340–343, publ. 1971.

Hart, G.L, et al., "In situ characterization of hydrologic properties of Sparta sand: relation to solute movement," Reprinted from Geoderma, vol. 64, (1994), pp. 41–55.

Lowery, Birl, "The Potential for Wetting Agents as Soil Additives," 1981 Fertilizer, Aglime & Pest Management Conference, vol. 20, pp. 86–90 University of Wisconsin–Madison.

Miller, W.W., et al., "Movement of Two Nonionic Surfactants in Wettable and Water–Repellent Soils," Soil Sci. Soc. Amer. Proc., vol. 39, 1975.

Mustafa, M.A. and Letey, J., "The Effect of Two Nonionic Surfactants on Aggregate Stability of Soils,"© 1969 The Williams & Wilkins Co., Soil Science, vol. 107, No. 5, pp. 343–347, publ. 1969.

(List continued on next page.)

Primary Examiner—S. Mark Clardy
(74) Attorney, Agent, or Firm—Carol Burton, Esq.; Hogan & Hartson, LLP

(57) ABSTRACT

A preferred technique for increasing potato crop yields and/or minimizing nitrate leaching of potato crop acreage involves the application of surfactant at planting to the soil adjacent a seed potato. In an alternative method of the present invention, surfactant is applied after planting to the top or shoulder of the hill in which a potato plant is growing. The improved potato crop yields of the present invention are believed to result of the maintenance of soil moisture levels near the potato plant root zone and/or the prevention of nitrogen and other nutrient-leaching from the potato plant root zone.

36 Claims, 7 Drawing Sheets

OTHER PUBLICATIONS

Pelishek, R.E., et al. "The Effect of Wetting Agents on Infiltration," Soil Science Society Proceedings 1962, pp. 595–598.

Saffigna, P.G., "Non–Uniform Infiltration Under Potato Canopies Caused by Interception, Stemflow, and Hilling," Agronomy Journal, vol. 79, pp. 337–342, publ. Mar.–Apr. 1976.

"Ad Vantage Formula One," Specimen Label, Wabash soil and plant, Van Wert, OH, publ. on or before Jul. 30, 1999.

"Preference Soybean Activated Non–Ionic Surfactant," Specimen Label, Cenex Land O'Lakes Agronomy Co., St. Paul, MN, publ. on or before Jul. 30, 1999.8.

"Material Safety Data Sheet LI–319," Loveland Industries, Inc., Greeley, Colorado, publ. Apr. 14, 1999.

"Activator N.F., Non–Foaming Non–Ionic Wetting Agent Surfactant Penetrant Spreader," Material Safety Data Sheet Activator NF, Loveland Industries, Inc., Greeley, CO, publ. May 19, 1994.

"Activator 90, Non–Ionic Surfactant Penetrant Low Foaming Biodegradable," Material Safety Data Sheet Activator 90, Loveland Industries, Inc., Greeley, Colorado, publ. May 30, 1996.

"#235 Wet–Sol 99," Material Safety Data sheet, Schaeffer Mfg. Co., St. Louis, MO, no date.

* cited by examiner

TECHNIQUE FOR REDUCING NITROGEN LEACHING IN SOILS AND IMPROVING POTATO CROP YIELD BY APPLICATION OF SURFACTANTS TO CROP ROOT ZONE

FIELD OF THE INVENTION

The present invention relates to compositions for application to potato crops and application techniques relating thereto.

BACKGROUND OF THE INVENTION

Potatoes to be used for seed pieces from which commercial quantities of potatoes are to be grown the following year, are grown specifically for that purpose for sale to growers. The commercial potato grower typically buy these seed potatoes just before planting. Small (e.g., 1½" diameter) seed potatoes are typically planted whole, 2" seed potatoes are cut in two, and larger seed potatoes are cut into thirds or quarters so that two "eyes" are present on each piece. Ideally, each seed piece weighs from 2 to 3 ounces. After the seed pieces have been cut, they may be treated with a rot/disease prevention dust.

Thereafter, the cut and treated seed pieces are planted in springtime in a hill formed by a planter, at a depth of from 3" to 9" and about 1' apart. As the seed pieces are placed in the ground by the planter, they are usually sprayed with a blight prevention compound and/or other disease-preventing pesticide(s).

Potatoes require significant amounts of nitrogen, and so a banded mixture of nitrogen, phosphorus, and potassium fertilizers are typically added to the soil near where the seed piece is to be planted just prior to or at planting. Then, about a week after plants emerge in mid- to late-May, another nitrogen fertilizer application is often made, for example, by dripping liquid urea ammonium nitrate of from 28% to 32% nitrogen onto the sides of the hill or applying a granular ammonium nitrate onto the sides of the hill. A hiller attachment then throws soil onto the sides of the hill to cover the newly-applied nitrogen fertilizer. This process is typically repeated a second time 7–10 days later. By this time, the potato plants will have become too large to send the fertilizer/hiller equipment through the fields. So, if further nitrogen supplements are required, a liquid nitrogen fertilizer such as liquid urea ammonium nitrate is sent through the irrigation water. Various herbicides, insecticides and fungicides may also be applied throughout the growing season, depending upon the need to prevent crop damage from various weeds, insects, diseases, and other problems.

Most commercial potato growers use central pivot irrigation systems to irrigate their crops, although irrigation scheduling varies. Growers typically irrigate in the absence of adequate rainfall, applying from 0.25 to 0.75 inches of water at a time, depending on need. In Wisconsin, growers may use the Wisconsin Irrigation Scheduling Program (WISP) to determine irrigation requirements. This program takes into account temperature, crop cover, evaporation, and transpiration to determine water deficit. Growers also use visual observation of plant water stress to determine irrigation needs. Because potatoes are especially sensitive to drought at tuber-setting time (i.e., when plants flower, and just after), irrigation is indicated when visual indications of water stress or soil dryness become present at tuber-setting time.

Whether irrigating according to a schedule or in response to visual indications of water stress or soil dryness, irrigation water may solubilize nitrogen and other fertilizers present in the soil and leach these compounds away from the potato plants. This is problematic not only because the potato plants will not benefit from needed fertilizer, but also because the groundwater can become contaminated with the excess fertilizer. There is added uncertainty because the potatoes being grown are not visible to the grower, making conditions actually present around the plant roots and adjacent the growing potatoes is not precisely known.

Referring now to FIG. 1, it can be seen that in an attempt to create better infiltration of the soil of a potato hill 22 by water for access by potato plant 20, growers may use surfactants 24 applied through an overhead sprinkler irrigation system. Surfactants 24 are conventionally broadcast in this manner 1 week to 10 days after emergence, with application of the first nitrogen fertilizers. This prior art technique is believed to create a surfactant distribution like that schematically illustrated in FIG. 1, in which the surfactant is believed to cover the hill and to pool in the furrows 26 between the hills. It is postulated by the inventor hereof, that this surfactant distribution actually leads to increased nitrate leaching.

It can thus be seen that a need remains for a safe and economical technique which minimizes soil dryness and water stress in potato plants. There also remains a need for techniques and compositions which minimize nitrate leaching in potato crop acreage and maintains a supply nutrients to growing potato plants for maximum crop yield. It is therefore against the background described above that the advances of the present invention have been made.

SUMMARY OF THE INVENTION

The present invention relates to a method of increasing potato crop yields by precision application of surfactant at planting to the soil adjacent a seed potato. In an alternative method of the present invention, surfactant is applied in a localized manner after planting to the top or shoulder of the hill in which a potato plant is growing. The improved potato crop yields of the present invention are believed to result of the maintenance of soil moisture levels near the potato plant root zone and/or the prevention of nitrogen and other nutrients from leaching away from the potato plant root zone. Accordingly, the methods of the present invention are also directed at minimizing undesirable nitrate-leaching in soils.

DETAILED DESCRIPTION

The present invention relates to a new technique of precision application of a food grade surfactant to potato crop acreage in which potatoes are being planted or have recently been planted, to increase potato crop yields and/or minimizing undesirable nitrate leaching away from the potato plant roots. In a preferred embodiment of the present invention, a food grade surfactant is applied to the soil adjacent a seed potato at planting prior to covering the potato with soil. In another preferred embodiment of the present invention, a food grade surfactant is applied in a stream or localized spray to the top and/or the shoulder of a potato plant hill. Presently preferred surfactants include non-ionic surfactants, e.g., Preference®, a non-ionic surfactant blend containing soybean based fatty acid and alcohol ethoxylates available from Cenex/Land O'Lakes Agronomy Company of St. Paul, Minn.; LI-319™, a non-ionic surfactant mixture of linear primary alcohol ethoxylates available from Loveland Industries, Inc. of Greeley, Colo.; Activator N.F.™ a non-foaming, non-ionic wetting agent, surfactant, penetrant and spreader containing primary aliphatic oxyalkylated alcohol, dimethylpolysiloxane and adjuvants, also available from Loveland Industries, Inc.; Wet-Sol 99™, a non-ionic surfactant containing poly(oxy-1,2 ethanediyl), alpha-(nonylphenyl)omega-hydroxy and a polysiloxane emulsion, available from Schaeffer Manufacturing Co. of St. Louis, Miss.; and AdVantage™ Formula One, a surfactant containing ammonium laureth sulfate, nonyl phenol ethoxylate and other constituents ineffective as spray adjuvant, available from Wabash soil and plant in Van Wert, Ohio. Activator 90™, a biodegradable, low-foaming, non-ionic surfactant and penetrant containing primary alkyl polyoxyethylene ether and free fatty acids and adjuvants, available from Loveland Industries, Inc., is a most preferred surfactant.

Figure 1:
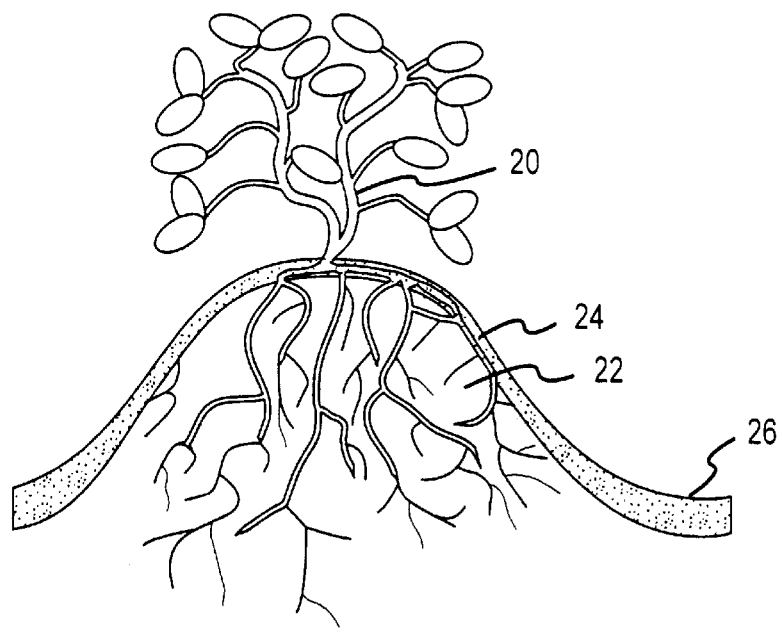
FIG. 1 is a schematic illustration of surfactant distribution on a potato hill utilizing the prior art technique of applying surfactant through an overhead sprinkler irrigation system.
Figure 2:
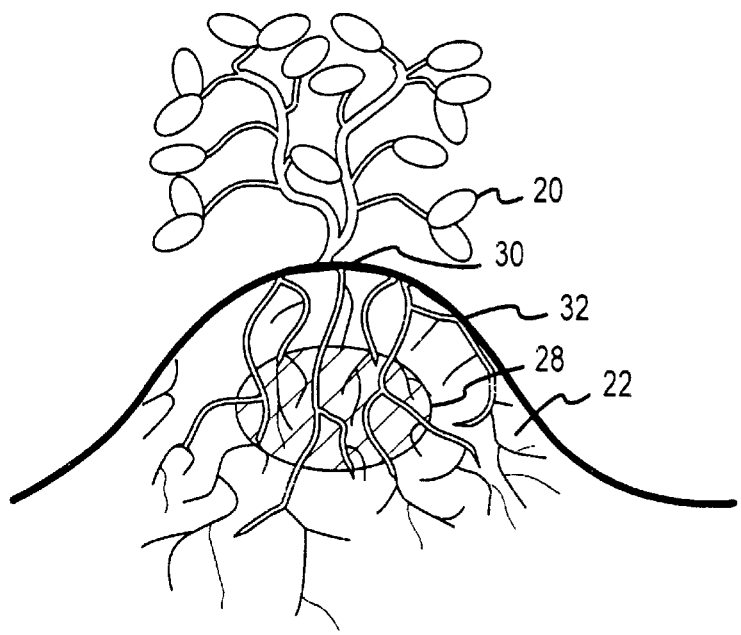
FIG. 2 is a schematic illustration of a dry zone in a potato hill.

The techniques of the present invention result from the inventor's attempt to obviate the development of a dry soil zone in the portion of potato hills containing the highest root density, confirmed by the inventor to be present in potato hills irrigated with overhead sprinkler systems. Referring now to FIG. 2, it can be seen that a dry zone 28 is located directly below the top 30 of potato hill 22 at a depth of approximately one foot, and extends laterally to below the shoulder 32 of hill 22. This dry zone 28 continues to desiccate over the growing season. The inventor hereof postulates that the dry zone in potato hills may result of the following causes: (1) high root density in this region may cause a large uptake and removal rate of soil moisture in the root zone; (2) hill geometry reduces infiltration of precipitation and irrigation water into the center of the hill and promotes water drainage to the furrow; (3) the potato canopy, which initially captures water and produces stem flow to the center portion of a potato hill, lays down as the growing season progresses and channels less water to the dry zone portion of the potato hill; and (4) sandy soils in which potatoes are often grown become hydrophobic as water content decreases in the soil, thereby reducing water infiltrating capacity in the dry zone.

To obviate this dry zone, surfactants were applied to potato hills as described below in Examples I through VI.

EXAMPLE I

Figure 3:
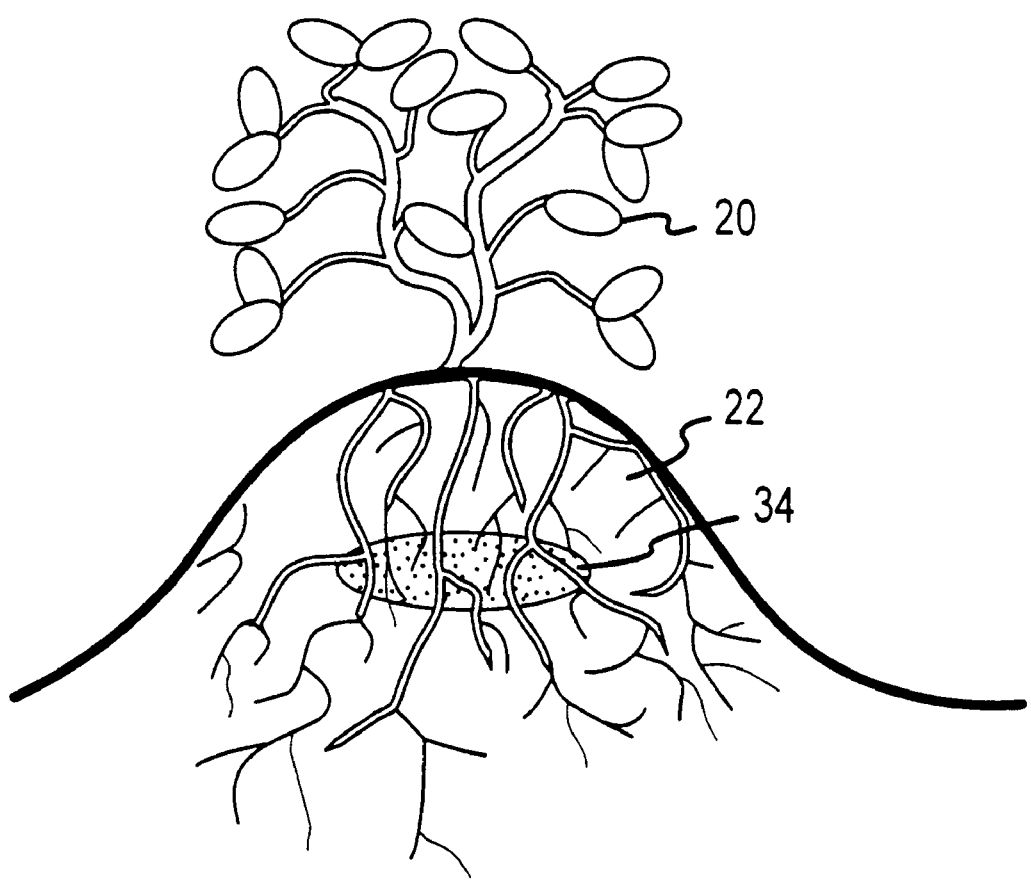
FIG. 3 is a schematic illustration of surfactant applied in a band adjacent a potato seed piece at planting in accordance with a preferred method of the present invention.

A first site at which the methods of the present invention were tested was In a large field at a family farm at Grand Marsh, Wis., in the Central Sands Area of Wisconsin on Plainfield sand. The site was divided into three plots 48 ft.×100 ft. each, consisting of 16 rows planted with a 36" row spacing. Eight rows served as the control to which no surfactant was applied. Referring now to FIG. 3, Preference® surfactant was applied to eight rows at planting in a precision 8" spray band or pattern 34 of surfactant over the seed potato pieces, which were then overlaid with approximately 9" of soil to form potato hill 22. Potato plants 20 thereafter grew and were treated by the grower using convention practices, and the potatoes ultimately harvested and evaluated. It can be appreciated by those skilled in the art that alternatively, the band or pattern 34 of surfactant may be applied to the ground centered around where the seed potato is to be placed, prior to so placing the seed potato and covering the seed potato with soil.

To assess the impact of surfactants on nitrate leaching, soil water sampling was conducted with porous-cup soil water samplers. Water content was measured with a dielectric capacitance technique called time domain reflectometry (TDR). The TDR system was used to monitor volumetric water contents at various depths and positions in the potato hill. Soil water content measurements were taken every 15 minutes during the growing season. Porous-cup samplers were installed at a 3' depth below the top of the potato hill. Soil water samples were collected from the porous-cup samplers weekly and analyzed for nitrates. It is believed that contaminants that reach a 3' depth generally cannot be removed by potato roots and possibly cannot be denitrified by microbial activity. It is further believed that nitrates at this depth will generally leach to the groundwater.

Figure 4:
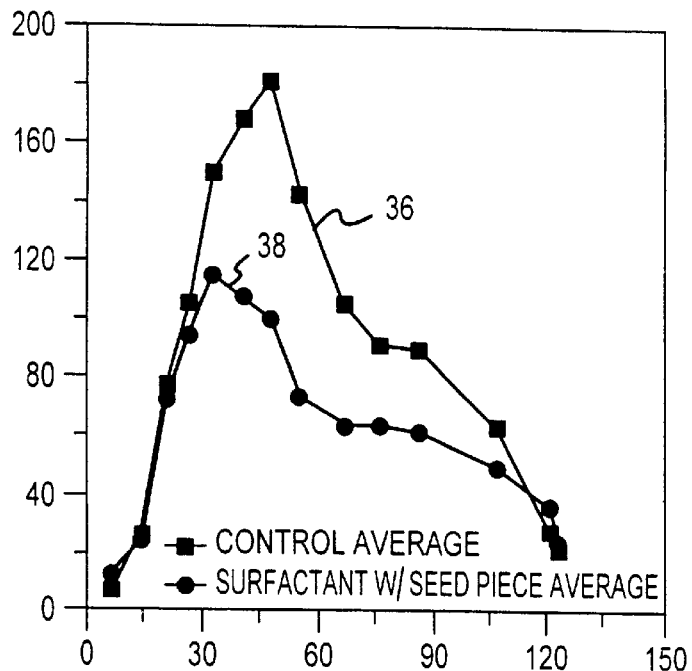
FIG. 4 compares graphically $NO_3$ measured as leaching below potato hills in treated and control plots at Grand Marsh, Wis., according to Example I.

Referring now to FIG. 4, the vertical axis represents nitrate-nitrogen ($NO_3$) in parts per million (ppm) reaching a 3' depth below the top of the potato hill. The horizontal axis represents time, in days, from shortly after plant emergent to 120 days after plant emergence. Trace 36 represents $NO_3$ average measurements of the control hills, and trace 38 represents $NO_3$ average measurements in the plots in which surfactant was precision applied to the seed potato and the adjacent soil, at planting, as described above. It can been seen from FIG. 4 that control $NO_3$ leaching from approximately 30 days to approximately 100 days is consistently higher than $NO_3$ leaching from the surfactant treated plot.

Crop yields were measured on each plot to determine differences in yield between treated and untreated plots. Taken as a whole, the control plot yielded 603 100 weight (cwt) potatoes per acre. In contrast, on average, the plot in which the soil adjacent the seed potato was treated with surfactant yielded 637 cwt potatoes per acre.

Figure 5:
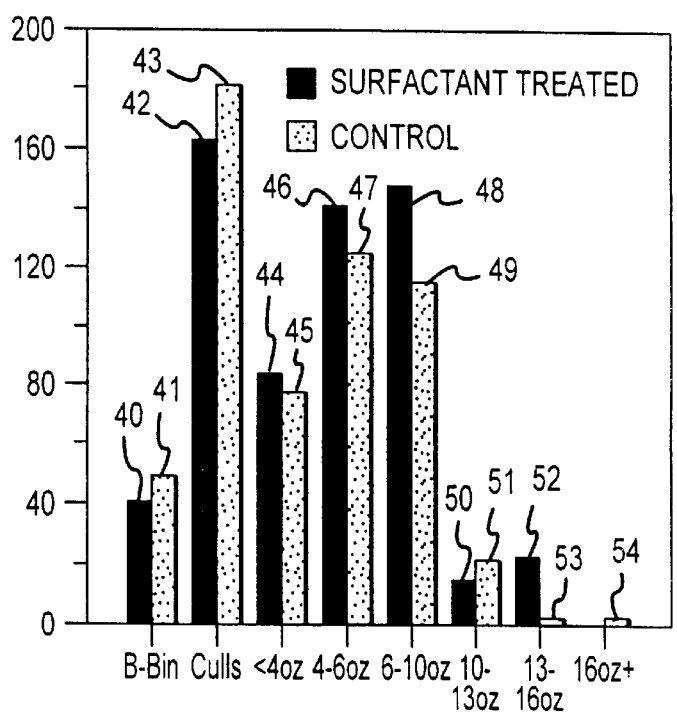
FIG. 5 compares graphically the yield size distribution of potatoes harvested from the treated and control plots at Grant Marsh, Wis., according to Example I.

Distribution of crop yields are compared graphically in FIG. 5. The vertical axis represented yield of each potato grade in cwt per acre. The horizonal axis represents, from left to right, increasing potato weight. Inedible potatoes are designated B-Bin potatoes. It can been seen that the total weight 40 of inedible potatoes grown in the surfactant-treated plots is less than the total weight 41 of inedible potatoes grown in the control plots. It can also be seen that the total weight 42 of culls (edible potatoes—but too small) grown in the surfactant-treated plots is less than the total weight 43 of culls grown in control plots. In contrast, the total weights 44, 46, 48 and 52 of potatoes grown in the surfactant-treated plots which are less than 4 ounces, from 4–6 ounces, from 6–10 ounces and from 13–16 ounces, respectively, are all larger the total weights 45, 47, 49 and 53 of potatoes grown in the control plots which are less than 4 ounces, from 4–6 ounces, from 6–10 ounces and from 13–16 ounces, respectively. At the 10–13 ounce size are the total weight 50 of potatoes from surfactant-treated plots less than the total weight 51 of potatoes from control plots. At the greater than 16 ounce size, the total weight 54 of potatoes from control plots was nominal, with none of the sampled potatoes from surfactant-treated plots greater than 16 ounces.

Data from a TDR system installed at the Grand Marsh site showed an increase in water content in the dry zone of the hills in plots treated with surfactant. Soil water content in plots treated with surfactant averaged approximately 5% higher than non-treated plots. Soil water content in the furrow was much lower in surfactant treated plots. Thus, there was higher infiltration rate in the potato hill and less runoff into the furrow in surfactant treated hills. It is postulated that this is due to better utilizing of nitrogen fertilizer, which movers with water and comes in contact with more roots in the center of the hill. Thus, it appears that more fertilizer/water solution penetrates the center of potato hills and less solution or water flows down the hillside into the furrow where there are few or not roots.

EXAMPLE II

Figure 6:
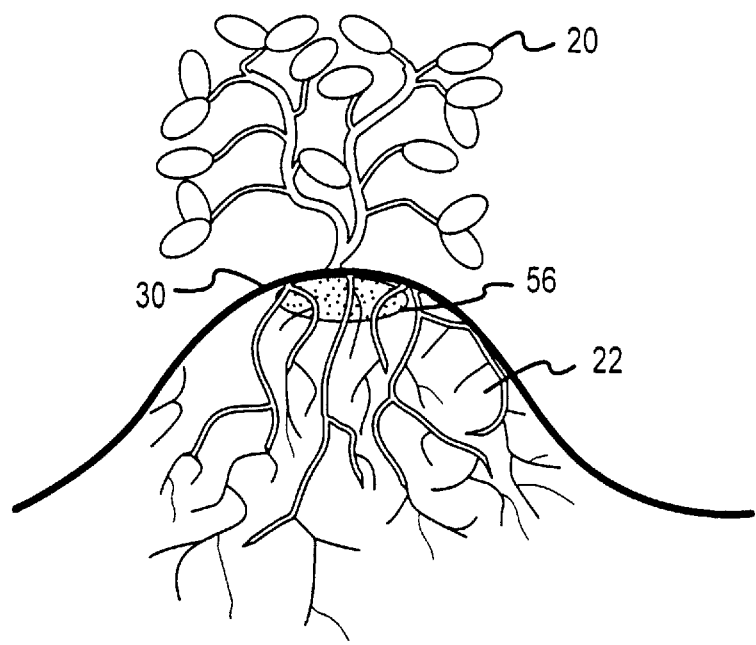
FIG. 6 is a schematic illustration of surfactant applied in a stream to the top of a hill in which a potato is grown before application of supplemental nitrogen to the crop in accordance with the present invention.
Figure 7:
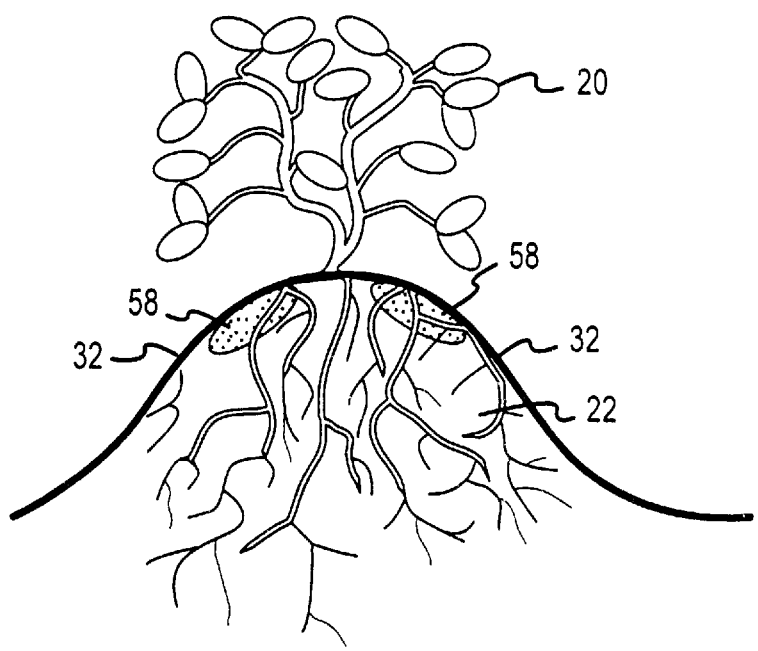
FIG. 7 is a schematic illustration of surfactant applied in a band to the shoulder of a hill in which a potato is grown before application of supplemental nitrogen to the crop in accordance with the present invention.

A second site at which the methods of the present invention were tested was a small plot of ground near Arena, Wis., in the Lower Wisconsin River Valley on Sparta sand. The Arena site contained three plots-each 11.3 ft.×80 ft. and consisting of four rows planted with 34" spacing. One plot was a control while the other two were test plots with applied surfactant. The surfactant was applied to the first of the two test plots by banding with a 3" stream spray pattern 56 of surfactant on the potato hilltop 30 prior to second supplemental nitrogen application, as schematically shown in FIG. 6. The surfactant was applied to the second of the two test plots by banding with two 3" stream spray patterns 58 of surfactant on the shoulders 32 of the potato hills prior to second supplemental nitrogen application, as schematically shown in FIG. 7. The potatoes were then grown according to conventional techniques. Nitrate leaching and total crop yields were measured as described above.

Figure 8:
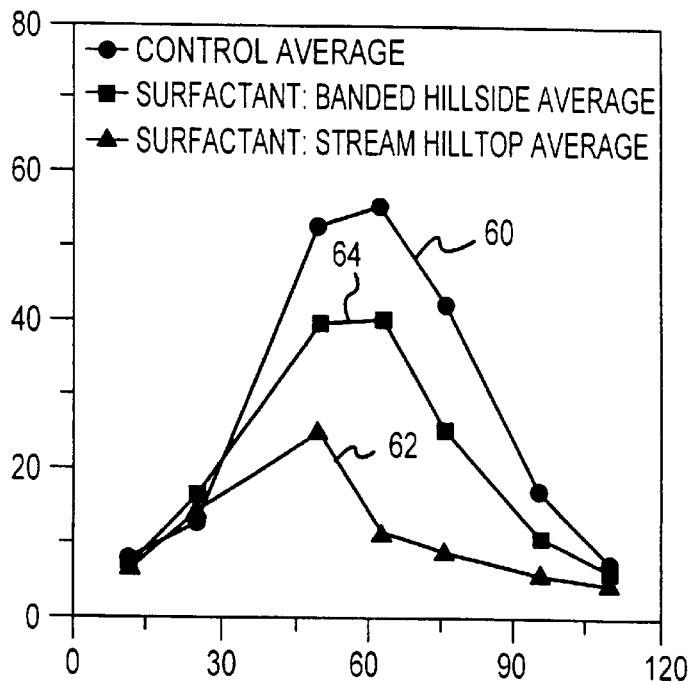
FIG. 8 compares graphically $NO_3$ measured as leaching below potato hills in treated and control plots at Arena, Wis. according to Example II.

Referring now to FIG. 8, where the y-axis represents ppm $NO_3$ reaching a 3' depth below the top of the potato hill and the x-axis represents days from plant emergence, trace 60 represents $NO_3$ average measurements of the control hills, trace 62 represents $NO_3$ average measurements in the plots in which surfactant was precision applied to the hilltops and trace 64 represents $NO_3$ average measurements in the plots in which surfactant was precision applied to the shoulders of the hills. It can been seen from FIG. 8 that control $NO_3$ leaching from approximately 45 days to approximately 110 days is consistently higher than $NO_3$ leaching in the surfactant treated plots. Further, it can also be seen that $NO_3$ leaching in the plots in which surfactant is precision applied to the hilltops is consistently less than $NO_3$ leaching in the hills in which surfactants are precision applied to the shoulders of the hills.

Total crop yields were also compared. Taken as a whole, the control plot yielded 213 cwt potatoes per acre, the plots in which surfactant was precision applied to the potato hilltops yielded 220 cwt potatoes per acre, and the plots in which surfactant was precision applied to the shoulders of the potato hills yielded 224 cwt potatoes per acre.

EXAMPLE III

A third site at which the methods of the present invention were tested was plot of ground near Spring Green, Wis. The Spring Green site was divided into 8 rows, each 500 feet long, with 34" spacing. Five treatments were performed: (1) control—no surfactant; (2) LI-319™ surfactant applied at an effective rate of 1.0 gallon per acre (although diluted) and applied with the seed piece at planting; (3) Activator NP™ surfactant applied at an effective rate of 1.0 gallon per acre (although diluted) and applied with the seed piece at planting: (4) Activator 90™ applied at an effective rate of 1.0 gallon per acre (although diluted) and applied with the seed piece at planting; and (5) Activator 90™ applied at an effective rate of 0.25 gallon per acre (although diluted). The potatoes were then grown according to conventional techniques. Nitrate leaching was measured as described above.

Figure 9:
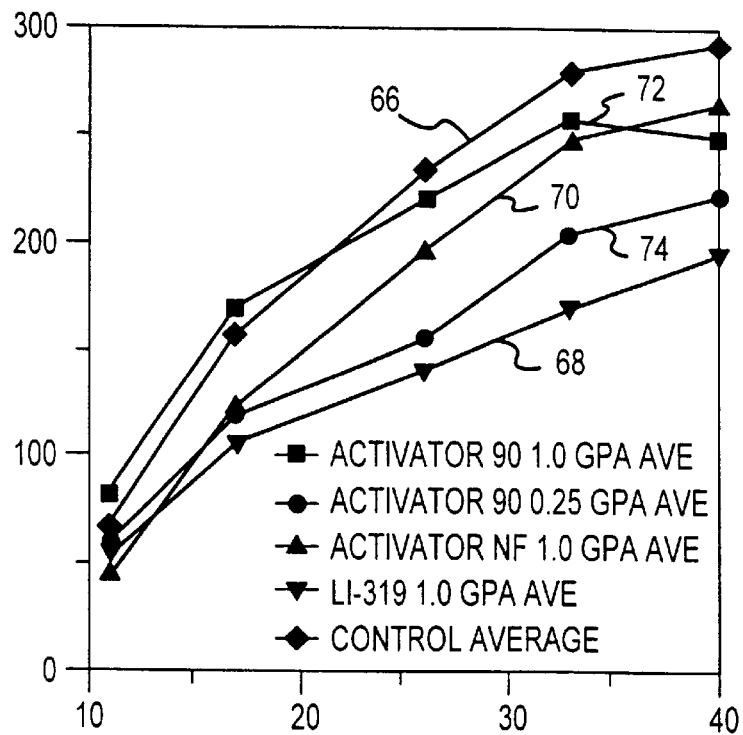
FIG. 9 compares graphically $NO_3$ measured as leaching below potato hills in treated and control plots at Spring Green, Wis. according to Example III.

Referring now to FIG. 9, where the y-axis represents ppm $NO_3$ reaching a 3' depth below the top of the potato hill and the x-axis represents days from plant emergence, traces 66, 68, 70, 72, 74 and 78 represent $NO_3$ average measurements of the control hills, the LI319™ hills (1.0 gal/acre), the Activator NF™ hills (1.0 gal/acre), the Activator 90™ hills (1.0 gal/acre) and the Activator 90™ hills (0.25 gal/acre), respectively. It can been seen from FIG. 9 that $NO_3$ leaching in control plots from approximately 25 days to 40 days is consistently higher than $NO_3$ leaching in the surfactant treated plots. Further, it can also be seen that $NO_3$ leaching in the plots in which the LI-319™ surfactant is precision applied is consistently lower than in all other plots.

Figure 10:
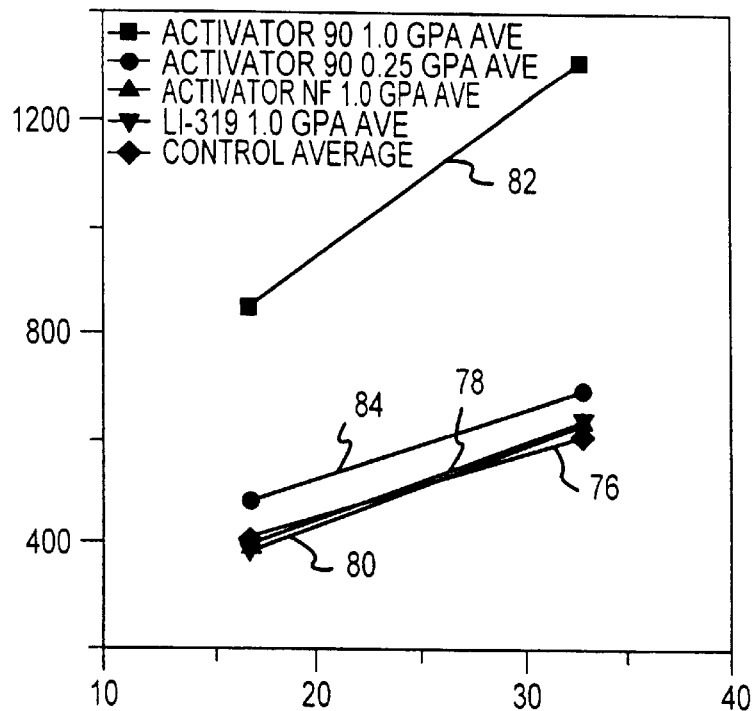
FIG. 10 compares graphically $NO_3$ measured as reaching the root zone 9" below the tops of potato hills in treated and control plots at Spring Green, Wis. according to Example III.

Referring now to FIG. 10, the y-axis represents ppm $NO_3$ reaching the root zone as measured at 9" depth below the top of the potato hill, the x-axis represents days from plant emergence, and traces 76, 78, 80, 82 and 84 represent $NO_3$ average measurements of the control hills, the LI319™ hills (1.0 gal/acre), the Activator NF™ hills (1.0 gal/acre), the Activator 90™ hills (1.0 gal/acre) and the Activator 90™ hills (0.25 gal/acre), respectively. It can been seen from FIG. 10 that there is a substantially similar amount of $NO_3$ reaching the control plants, the potato plants grown in the LI-319™ treated hills, and the potato plants grown in the Activator NF™ treated hills. Measurably more $NO_3$ is measured as present at the 9" depth in the plots treated as described above with 0.25 gallons per acre of Activator 90™ surfactant.

EXAMPLE IV

A fourth site at which the methods of the present invention were tested was plot of ground near Coloma, Wis. The Coloma site was divided into 24 rows, each 1300 feet long, with 30" spacing. Five treatments were performed: (1) control-no surfactant; (2) Wet-Sol 99™ surfactant applied at an effective rate of 0.25 gallon per acre (although diluted) in a stream to the hilltop after emergence prior to the first supplemental nitrogen; (3) Wet-Sol 99™ surfactant applied at an effective rate of 0.50 gallon per acre (although diluted) in a stream to the hilltop after emergence prior to the first supplemental nitrogen; (4) Ad Vantage™ surfactant applied at an effective rate of 0.50 gallon per acre (although diluted) in a stream to the hilltop after emergence prior to the first supplemental nitrogen; and (5) Ad Vantage™ surfactant applied at an effective rate of 0.25 gallon per acre (although diluted) in a stream to the hilltop after emergence prior to the first supplemental nitrogen. The potatoes were then grown according to conventional techniques. Nitrate leaching was measured as described above.

Figure 11:
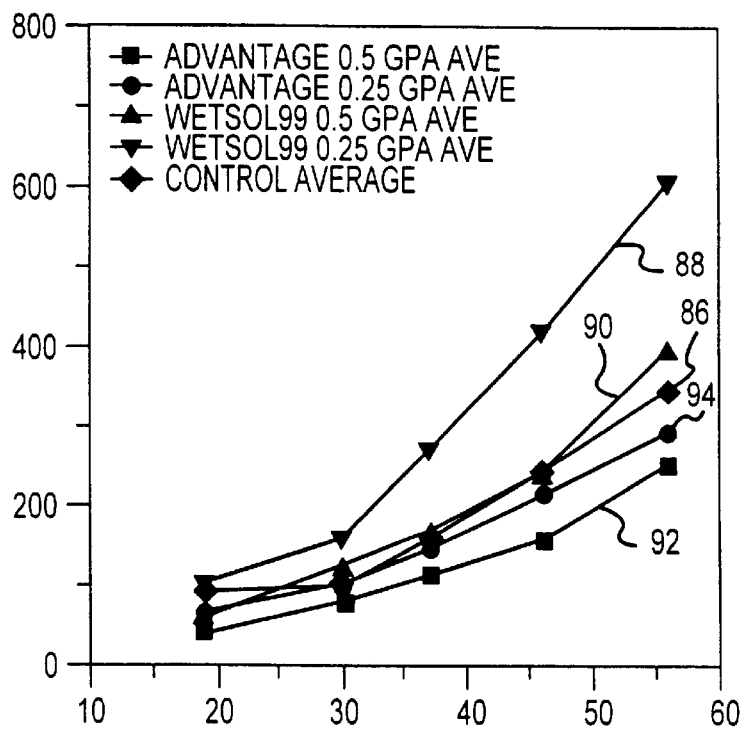
FIG. 11 compares graphically $NO_3$ measured as leaching below potato hills in treated and control plots at Coloma, Wis. according to Example IV.

Referring now to FIG. 11, where the y-axis represents ppm $NO_3$ reaching a 3' depth below the top of the potato hill and the x-axis represents days from plant emergence, traces 86, 88, 90, 92 and 94 represent $NO_3$ average measurements of the control hills, the Wet-Sol 99™ hills (0.25 gal/acre), the Wet-Sol 99™ hills (0.50 gal/acre), the Ad Vantage™ hills (0.50 gal/acre), the Ad Vantage™ hills (0.25 gal/acre), respectively. It can been seen from FIG. 11 that $NO_3$ leaching in control plots from approximately 30 days to 55 days is slightly higher than $NO_3$ leaching in the Ad Vantage™ treated plots, with $NO_3$ leaching in the hills treated with 0.25 gallons per acre of Wet-Sol 99™ greater than that of the control plots.

EXAMPLE V

Additional tests of the methods of the present invention were tested at Grand Marsh, Wis. The site was divided into 8 rows, 36" wide and 1050 feet long. Eight treatments were performed: (1) control-no surfactant; (2) Preference® surfactant applied at an effective rate of 1.0 gal/acre with seed piece at planting; (3) Preference® surfactant applied at an effective rate of 0.25 gal/acre with seed piece at planting; (4) Preference® surfactant applied at an effective rate of 0.5 gal/acre with seed piece at planting; (5) Preference® surfactant applied at an effective rate of 1.0 gal/acre to the top and shoulders of the hill prior to the second supplemental nitrogen application; (6) Preference® surfactant applied at an effective rate of 0.25 gal/acre to the top and shoulders of the hill prior to the second supplemental nitrogen application; (7) Preference® surfactant applied at an effective rate of 0.5 gal/acre to the top and shoulder of the hill prior to the second supplemental nitrogen application. The applications to the top and shoulders of the hill extended to approximately 6–7 inches to over the shoulder of each side of the center of the hill. The potatoes were then grown according to conventional techniques. Nitrate leaching was measured as described above.

Figure 12:
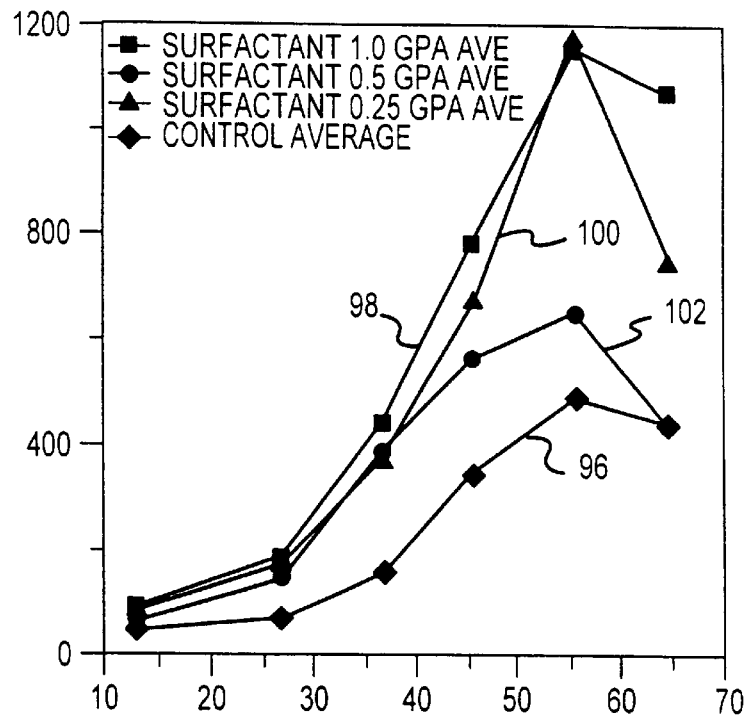
FIG. 12 compares graphically $NO_3$ measured as leaching below potato hills in treated and control plots at Grand Marsh, Wis. according to Example V.

Referring now to FIG. 12, where the y-axis represents ppm $NO_3$ reaching a 3' depth below the top of the potato hill and the x-axis represents days from plant emergence, traces 96, 98, 100 and 102 represent $NO_3$ average measurements of the control hills, the hilltops treated with 1.0 gal/acre Preference™ surfactant, the hilltops treated with 0.25 gal/acre Preference™ surfactant, and the hilltops treated with 0.50 gal/acre Preference™ surfactant, respectively. It can been seen from FIG. 12 that $NO_3$ leaching in control plots from approximately 27 days to 65 days after emergence is less than $NO_3$ leaching in the hills treated at planting with Preference™ surfactant by application to the soil adjacent the seed piece. This is believed to result from the unlocalized/imprecise nature of the surfactant application, which caused solubilized nitrates to flow to the sides of the hill and towards the furrows therebetween, in manner not the results seen when applying surfactants using prior art broadcast spray techniques.

Figure 13:
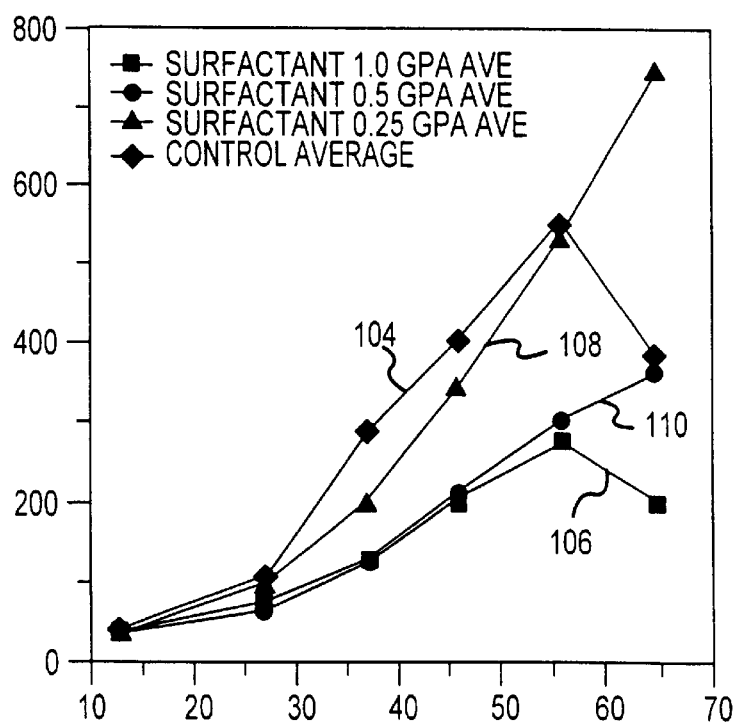
FIG. 13 compares graphically $NO_3$ measured as leaching below potato hills in treated and control plots at Grand Marsh, Wis. according to Example V.

Referring now to FIG. 13, where the y-axis represents ppm $NO_3$ reaching a 3' depth below the top of the potato hill and the x-axis represents days from plant emergence, traces 104, 106, 108 and 110 represent $NO_3$ average measurements of the control hills, seed potato pieces and adjacent soils treated with 1.0 gal/acre Preference™ surfactant at planting, seed potato pieces and adjacent soils treated with 0.25 gal/acre Preference™ surfactant at planting, andseed potato pieces and adjacent soils treated with 0.50 gal/acre Preference™ surfactant at planting, respectively. It can been seen from FIG. 13 that $NO_3$ leaching in control plots from approximately 27 days to 65 days after emergence, that $NO_3$ leaching in the control plot is greater than $NO_3$ leaching in the hills treated with Preference™ surfactant at planting.

It is therefore believed that substantial improvement in reduction of nitrate leaching away from the root zone of potato plants can be achieved by precision application of surfactants to the soil immediately adjacent where a seed potato piece is being planted, just prior to covering the seed potato piece with soil. It is also believed that improvement in reduction of nitrate leaching away from the root zone of potato plants may be achieved by precision application of surfactants to the hilltop after planting and early in the growing season. Some improvement in reduction of nitrate leaching may also be achieved by precision application of surfactants to the shoulders of the potato hills, it being understood that the term "shoulder" as used herein extends from near the top of the hill to where the hill falls off substantially, but does not include the sides of the potato hills below the shoulder and/or leading into the furrow. In contrast, nitrate leaching away from the root zone of the potato plant may be exacerbated when surfactants are applied in significant amounts to the sides of potato hills.

When the localized surfactant application technique of the present invention is performed by application of surfactant to the seed potato piece after placement in the ground but directly before covering with soil to form the potato hill or is performed to the ground where the seed potato piece is to be placed and covered, then the preferred precision surfactant application spray pattern is from approximately 5" to approximately 15" wide in a continuous path along the length of the row, with the most preferred precision surfactant application spray pattern from approximately 9" to approximately 12" wide.

When the localized surfactant application technique of the present invention is performed by application of surfactant to the center of the top of the potato hill after seed potato piece placement and soil coverage, then the preferred precision surfactant application spray or stream pattern is from approximately ½" to approximately 9" wide in a continuous path along the length of the row, with the most preferred precision surfactant application spray or stream pattern from approximately 1" to approximately 5" wide.

When the localized surfactant' application technique of the present invention is performed by application of surfactant to the shoulders of the potato hill after seed potato piece placement and soil coverage, then the preferred precision surfactant application spray or stream pattern is a pair of parallel rows each from approximately ½" to approximately 3" wide in a continuous path along the length of the row, with the outer edge of each row not extending beyond approximately 6" from the center of the longitudinal axis of the hill.

Currently, preferred embodiments of the present invention and many improvements have been described with a degree of particularity. It should be understood that the present invention is defined by the spirit and scope of the following claims.

What is claimed is:

1. A method of increasing potato crop yield comprising the steps of:
   forming a furrow and placing a seed potato in the furrow with a mechanical planter;
   applying a surfactant at seed potato planting to the soil adjacent an uncovered seed potato; and
   covering the seed potato with soil to form a hill at least 3" in height over the potato.

2. The method of claim 1 wherein the surfactant is a non-ionic surfactant.

3. The method of claim 1 wherein the non-ionic surfactant includes an alcohol ethoxylate.

4. The method of claim 1 wherein the surfactant is applied in a pattern approximately 5" to approximately 15" wide.

5. The method of claim 2 wherein the surfactant is applied in a pattern approximately 5" to approximately 15" wide.

6. The method of claim 3 wherein the surfactant is applied in a pattern approximately 5" to approximately 15" wide.

7. The method of claim 1 wherein the surfactant is applied in a pattern approximately 9" to approximately 12" wide.

8. The method of claim 2 wherein the surfactant is applied in a pattern approximately 9" to approximately 12" wide.

9. The method of claim 2 wherein the surfactant is applied in a pattern approximately 9" to approximately 12" wide.

10. A method of increasing potato crop yield comprising the steps of:
    forming a furrow and placing a seed potato in the furrow with a mechanical planter;
    applying a localized pattern of surfactant after seed potato planting to the top of the hill of soil overlying where the seed potato was planted; and
    covering the seed potato with soil to form a hill at least 3" in height over the potato.

11. The method of claim 10 wherein the surfactant is a non-ionic surfactant.

12. The method of clam 11 wherein the non-ionic surfactant includes an alcohol ethoxylate.

13. The method of claim 10 wherein the pattern is a strip along the center of the hill of from approximately ½" to approximately 9" wide.

14. The method of claim 11 wherein the pattern is a strip along the center of the hill of from approximately ½" to approximately 9" wide.

15. The method of claim 12 wherein the pattern is a strip along the center of the hill of from approximately ½" to approximately 9" wide.

16. The method of claim 10 wherein the pattern is a strip along the center of the hill of from approximately 1" to approximately 5" wide.

17. The method of claim 11 wherein the pattern is a strip along the center of the hill of from approximately 1" to approximately 5" wide.

18. The method of claim 12 wherein the pattern is a strip along the center of the hill of from approximately 1" to approximately 5" wide.

19. A method of preventing undesirable nitrate leaching away from the root zones of potato plants comprising the steps of:
    forming a furrow and placing a seed potato in the furrow with a mechanical planter;
    applying a surfactant at seed potato planting to the soil adjacent an uncovered seed potato; and
    covering the seed potato with soil to form a hill at least 3" in height over the potato.

20. The method of claim 19 wherein the surfactant is a non-ionic surfactant.

21. The method of claim 19 wherein the non-ionic surfactant includes an alcohol ethoxylate.

22. The method of claim 19 wherein the surfactant is applied in a pattern approximately 5" to approximately 15" wide.

23. The method of claim 20 wherein the surfactant is applied in a pattern approximately 5" to approximately 15" wide.

24. The method of claim 21 wherein the surfactant is applied in a pattern approximately 5" to approximately 15" wide.

25. The method of claim 19 wherein the surfactant is applied in a pattern approximately 9" to approximately 12" wide.

26. The method of claim 20 wherein the surfactant is applied in a pattern approximately 9" to approximately 12" wide.

27. The method of claim 21 wherein the surfactant is applied in a pattern approximately 9" to approximately 12" wide.

28. A method of preventing undesirable nitrate leaching away from the root zones of potato plants comprising the steps of:
    forming a furrow and placing a seed potato in the furrow with a mechanical planter;
    applying a localized pattern of surfactant after seed potato planting to the top of the hill of soil overlying where the seed potato was planted; and
    covering the seed potato with soil to form a hill at least 3" in height over the potato.

29. The method of claim 28 wherein the surfactant is a non-ionic surfactant.

30. The method of claim 29 wherein the non-ionic surfactant includes an alcohol ethoxylate.

31. The method of claim 28 wherein the pattern is a strip along fine center of the hill of from approximately ½" to approximately 9" wide.

32. The method of claim 29 wherein the pattern is a strip along the center of the hill of from approximately ½" to approximately 9" wide.

33. The method of claim 31 wherein the pattern is a strip along the center of the hill of from approximately ½" to approximately 9" wide.

34. The method of claim 28 wherein the pattern is a strip along the center of the hill of from approximately 1" to approximately 5" wide.

35. The method of claim 29 wherein the pattern is a strip along the center of the hill of from approximately 1" to approximately 5" wide.

36. The method of claim 31 wherein the pattern is a strip along the center of the hill of from approximately 1" to approximately 5" wide.

* * * * *